Figure 1:
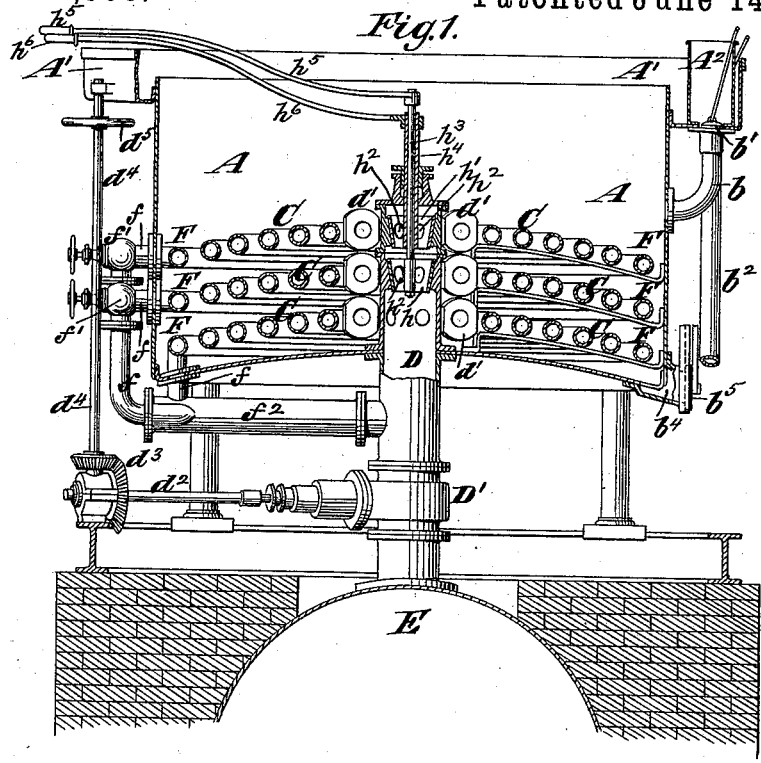

(No Model.)

G. A. DAUDT.
COIL FOR HEATING EVAPORATING PANS.

No. 364,908. Patented June 14, 1887.

Witnesses:
C. Sundgren
Henry McBride

Inventor:
George A. Daudt
by his attys
Brown & Hall

UNITED STATES PATENT OFFICE.

GEORGE A. DAUDT, OF JERSEY CITY, NEW JERSEY.

COIL FOR HEATING EVAPORATING-PANS.

SPECIFICATION forming part of Letters Patent No. 364,908, dated June 14, 1887.

Application filed October 14, 1886. Serial No. 216,207. (No model.)

*To all whom it may concern:*

Be it known that I, GEORGE A. DAUDT, of Jersey City, in the county of Hudson and State of New Jersey, have invented a new and useful Improvement in Coils for Heating Evaporating-Pans, of which the following is a specification.

My invention is applicable to coils and other connections employed for heating kettles, open pans, vacuum-pans, &c., for evaporating and concentrating sugar, and for other purposes; and the invention may also be embodied in condensers for steam or ammoniacal gas and in heating or cooling apparatus for other purposes.

My invention relates to apparatus which comprises a kettle, pan, or other vessel, a fluid-supply header or distributer arranged therein, and one or more convolute pipes extending from the supply-header, and through which steam or other fluid may circulate for effecting the interchange of heat between the fluid passing through the pipes or coils and the fluid which is contained within the kettle, pan, or casing. In such apparatus two or more series of convolute pipes or tubes may be employed, arranged one above another, and each series comprising two or more convolute tubes, in which case all the convolute tubes in the two or more series will take their supply of fluid from a single central header or distributer.

In apparatus of the kind above referred to, as heretofore constructed, each convolute tube has had its delivery end extended through the wall of the pan, kettle, or casing to the exterior thereof, independently of all the other convolute tubes, and hence there have been as many connections through the wall of the kettle or pan as there are convolute tubes, and a comparatively large number of packed joints have been necessarily employed.

An important object of my invention is to provide for a final delivery of all the water of condensation or other fluid from the two or more convolute tubes of the series through a single branch connection leading through the wall of the kettle or pan to the exterior thereof, whereby I reduce the number of connections extending through the wall of the kettle or pan; and a further object of the invention is to provide for utilizing to the greatest extent the heat which will be retained in the water of condensation or other fluid after it is delivered from the convolute pipes or tubes.

The invention consists, essentially, in the combination, with a kettle, pan, or vessel and a fluid supply header arranged therein, of two or more convolute pipes extending from the supply-header, and an annular pipe surrounding the convolute pipes within the kettle, pan, or vessel, and with which they are connected, and which is provided with a discharge branch extending to the exterior of the kettle, pan, or vessel. The two or more convolute tubes which are comprised in the series all deliver their water of condensation or other fluid into the annular pipe, and such water or fluid all passes outward through the single branch extending through the wall of the kettle, pan, or vessel, and the contents of the kettle, pan, or vessel is heated by the water of condensation or other fluid in the annular pipe.

I may employ two or more series of convolute tubes arranged one above the other in the kettle or pan, and all taking their supply of steam or other fluid from the same supply-header, and in such case I employ valves, whereby the flow of steam or other fluid from the header to the convolute pipes or tubes of each series may be separately controlled, and each series of convolute tubes is surrounded by an annular pipe or tube having a branch extending to the exterior of the kettle or vessel.

When the apparatus is employed for heating purposes, the supply-header, which is within the kettle, pan, or vessel, may be connected directly with the steam pipe or boiler, and may be provided with a valve, whereby the flow of steam to supply the system of convolute tubes may be controlled, and the several branches extending from the annular pipes may be controlled by separate valves, and may deliver the water of condensation directly into the supply-header below the kettle or pan, in order to return such water to the boiler.

The above-described and other features of construction and combination are all included in my invention, which is hereinafter more fully described, and pointed out in the claims.

Figure 2:
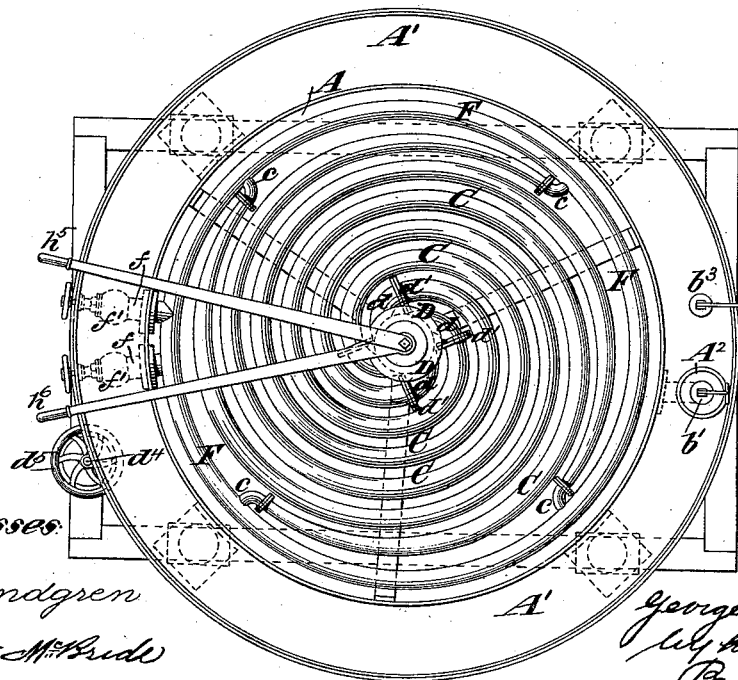

In the accompanying drawings, Figure 1 is a vertical section of an apparatus embodying my invention, including a portion of the boiler from which it receives its supply of steam; and Fig. 2 is a plan of the apparatus.

Similar letters of reference designate corresponding parts in both figures.

A designates an open-top pan or kettle, which may be made of copper or other metal. At the top of the pan or kettle A is an annular channel, A', which, as shown in Fig. 1, has a fall or inclination from one side of the pan or kettle to the other. At the lower side of this annular channel A' is a well or compartment, $A^2$, which communicates through a pipe, $b$, and under control of a valve, $b'$, with the pan or kettle A, and from the bottom of such lower portion of the annular channel A' leads a pipe, $b^2$, which is controlled by a valve, $b^3$.

At the bottom of the pan or kettle is an outlet throat or opening, $b^4$, which is controlled by a valve, $b^5$, and through which the contents of the pan or kettle may be discharged. In order to facilitate the complete discharge of all the contents from the pan or kettle, the bottom thereof is made concave or crowning from the periphery to the center, and the outlet-throat $b^4$, being at the extreme periphery, is at the lowest point in the pan or kettle.

Within the pan or kettle I arrange one or more series of convolute pipes or tubes, and each series comprises two or more convolute tubes, C, which are in substantially the same plane. In the present example of my invention each series comprises four convolute tubes or pipes, as best shown in Fig. 2, and the three series of convolute tubes or pipes which are here shown are arranged one above another, each series being arranged in concave form corresponding to the concave bottom of the pan or kettle A, as best shown in Fig. 1.

D designates a fluid-supply header, which, as here shown, is arranged vertically at the center of the pan or kettle A, and projects upward through the bottom thereof. This supply-header D, where the series of convolute tubes C are to receive steam, may communicate directly with a steam-boiler through a suitable pipe.

In the present example of invention the header D is represented as springing upward from the top of a boiler, a portion of which is shown at E; but the pan or kettle may be arranged at any suitable distance from the boiler, and the pipe for conducting steam from the boiler to the supply-header D may be arranged in any suitable manner. The convolute tubes of each series receive their supply of fluid from the header D, and said header may be provided, as shown in Fig. 2, with bends $d$, to which the inner ends of the convolute tubes C are connected by flanged or other joints $d'$. By the arrangement in the series of a number of convolute tubes, as described, steam has a less distance to travel than it would have in the case of a single spiral tube having its coils arranged at the same distance apart as are the coils of the several convolute tubes, and in a pan of a given size the heating of the contents may be more readily effected.

In pans having a number of convolute tubes in each series, as heretofore constructed, each tube has had a separate connection with the delivery-passage through the wall of the pan or kettle, and hence there have been a large number of joints which have required to be carefully packed, and in which leakage is likely to occur. To obviate these objections I surround each series of convolute tubes C by an annular pipe or tube, F, which is arranged within the pan or kettle A near the periphery thereof, as shown in Fig. 2, and with each annular pipe or passage F are connected all the convolute tubes C in the corresponding series.

I have represented the tubes C as connected with the pipe or passage F at the points $c$, and the tubes C for a distance inward from their outer ends, which are connected with the pipe or passage F, are made tapering or of gradually-reduced diameter toward the pipe or passage, and in this way a greater length of tube between the points of supply and delivery is obtained than would be possible if the tubes were of uniform diameter to their points of connection with the passage or tube F, because in the latter case a less length of convolute tube C would be used.

The annular tube or pipe F, into which each series of convolute tubes C delivers the fluid or water of condensation, has a single branch, $f$, extending through the wall of the pan or kettle to the exterior thereof, and hence for each series of convolute tubes there is but a single connection through the wall of the kettle or pan, in lieu of a number of connections corresponding to the number of convolute tubes, as has been the case heretofore. Not only is the arrangement of the annular pipe or tube F within the pan or kettle desirable because of the single connection through the wall of the kettle, but it is further desirable because by such an arrangement the heat which may remain in the water of condensation or other fluid after it enters the annular pipe or tube F may be available in further heating the contents of the pan or kettle.

I have represented in the supply-header D a valve, D', the stem $d^2$ of which may be turned by any suitable mechanism—such, for example, as gearing $d^3$ and an upright shaft, $d^4$, provided with a hand-wheel, $d^5$. Where but a single series of convolute tubes C are employed in a pan, no valves are necessary other than the valve D', which may be closed to entirely cut off the passage through the header D, and an outlet branch, $f$, leading from the lower annular pipe or tube, F, may also be destitute of a valve. Where two or more series of convolute tubes C are employed, as in this case, valves are necessary to control the passage of fluid through all the tubes except those of one series.

Inasmuch as three series of tubes are here represented, I have shown two valves, $h\ h'$, whereby the passage of fluid to the tubes of the two upper series may be controlled. In this example of my invention the valves $h$ $h'$ consist simply of taper hollow plugs or shells, which are fitted to suitable taper seats in the header D, as shown in Fig. 1, and which are provided with ports or openings $h^2$, whereby the passages leading to the several convolute tubes in the two series may be opened or closed by turning the valves $h$ $h'$. As here represented, the two valves $h$ $h'$ may be turned by means of stems $h^3$ $h^4$, arranged one within the other, and to which are applied handles $h^5$ $h^6$, as is clearly shown in Fig. 1.

I have also represented the branches $f$, leading from the annular pipes or tubes F of the two upper series of convolute tubes C, as provided with valves $f'$, whereby the flow of water of condensation or other liquid through the branches $f$ may be controlled. In this example of my invention all the outlet branches $f$, through which the water of condensation or other fluid passes from the three series of convolute tubes C, are connected with the collector $f^2$, which delivers the water of condensation into the supply-header D, and such water is, through the header, returned to the boiler E. The header D is in such case made of sufficient size to enable the water of condensation to return through it to the boiler without in any way interfering with the passage of steam through the header D to supply the coils. In case the branches $f$, leading from the annular pipes or tubes F, were not arranged to return the water of condensation to the steam-supply header, the valves $f'$ might not be necessary, as the flow of steam through one or more of the series of convolute tubes C would be properly controlled by the valve D' and the valves $h$ $h'$.

The arrangement of two or more convolute tubes C in each series is desirable, for the additional reason that by it the greatest heat is produced near the center of the evaporating pan or kettle; or, in case the invention be embodied in other apparatus, the greatest and most active interchange of heat between the contents of the pan or kettle and the contents of the tubes is at or near the center of the pan or kettle.

What I claim as my invention, and desire to secure by Letters Patent, is—

1. The combination, with a kettle, pan, or vessel and a fluid-supply header arranged therein, of two or more convolute tubes extending from the header, and an annular pipe or tube surrounding the convolute tubes within the kettle, pan, or vessel, and with which they are connected, and which is provided with a branch extending to the exterior of the kettle, pan, or vessel, substantially as herein described.

2. The combination, with a kettle, pan, or vessel and a fluid-supply header arranged therein, of two or more series of convolute tubes arranged one above another, and each series comprising two or more tubes, all connected with and receiving fluid from the single header, and annular pipes or tubes, one for each series, arranged within the kettle, pan, or vessel, and having the outer ends of the convolute tubes connected with them, and each provided with a discharge branch extending to the exterior of the kettle, pan, or vessel, substantially as herein described.

3. The combination, with a kettle, pan, or vessel, of a fluid-supply header, D, arranged therein, two or more series of convolute tubes arranged one above another, each series comprising two or more tubes, C, valves whereby the passage of fluid from the header to the convolute tubes of one or more series may be controlled, and annular pipes or tubes F, surrounding the series of convolute tubes, and each having a branch extending to the exterior of the kettle, pan, or vessel, substantially as herein described.

4. The combination, with a kettle, pan, or vessel, of a fluid-supply header, D, arranged therein, one or more series of convolute tubes arranged one above another, each series comprising two or more tubes, C, which are tapered or gradually reduced in diameter toward their outer ends, and one or more annular pipes or tubes, F, surrounding the one or more series of convolute tubes, the tapered ends of the tubes of each series being connected with a single annular pipe or tube, and each annular pipe or tube having a branch extending to the exterior of the kettle, pan, or vessel, substantially as herein described.

GEORGE A. DAUDT.

Witnesses:
 FREDK. HAYNES,
 EMIL HERTER.